United States Patent [19]
Shigeyasu et al.

[11] 3,846,487
[45] Nov. 5, 1974

[54] PROCESS FOR THE PRODUCTION OF FIBER GRADE TEREPHTHALIC ACID
[75] Inventors: Motoo Shigeyasu; Kenzo Kuihara; Michio Kuki, all of Ehime, Japan
[73] Assignee: Maruzen Oil Co., Ltd., Osaka, Japan
[22] Filed: Nov. 1, 1971
[21] Appl. No.: 194,468

[30] Foreign Application Priority Data
Nov. 1, 1970  Japan.............................. 45-96334

[52] U.S. Cl............................................ 260/524 R
[51] Int. Cl........................ C07c 63/26, C07c 51/20
[58] Field of Search ................................ 260/524 R

[56] References Cited
UNITED STATES PATENTS
2,833,816  5/1958  Saffer et al. ..................... 260/524

Primary Examiner—Lorraine A. Weinberger
Assistant Examiner—Richard D. Kelly
Attorney, Agent, or Firm—Sughrue, Rothwell, Mion, Zinn & MacPeak

[57] ABSTRACT

A process for producing fiber grade terephthalic acid by subjecting $p$-xylene to a liquid phase oxidation with oxygen or an oxygen-containing gas in the presence of an oxidation catalyst comprising cobalt, manganese and bromine and in the presence of a lower aliphatic carboxylic acid solvent, said catalyst comprising: (a) the amount of cobalt is in the range of 0.05 – 0.50 percent by weight based on the solvent, (b) the amount of the manganese is in the range of 1 – 20 percent by weight based on cobalt, (c) the source of bromine is cobalt bromide, free bromine, or a mixture thereof, and (d) the weight ratio of bromine to cobalt is in the range of 1.5:1–6.0:1. Terephthalic acid thus obtained can be used as a raw material of direct polymerization with glycols for providing high quality polyester.

22 Claims, 8 Drawing Figures

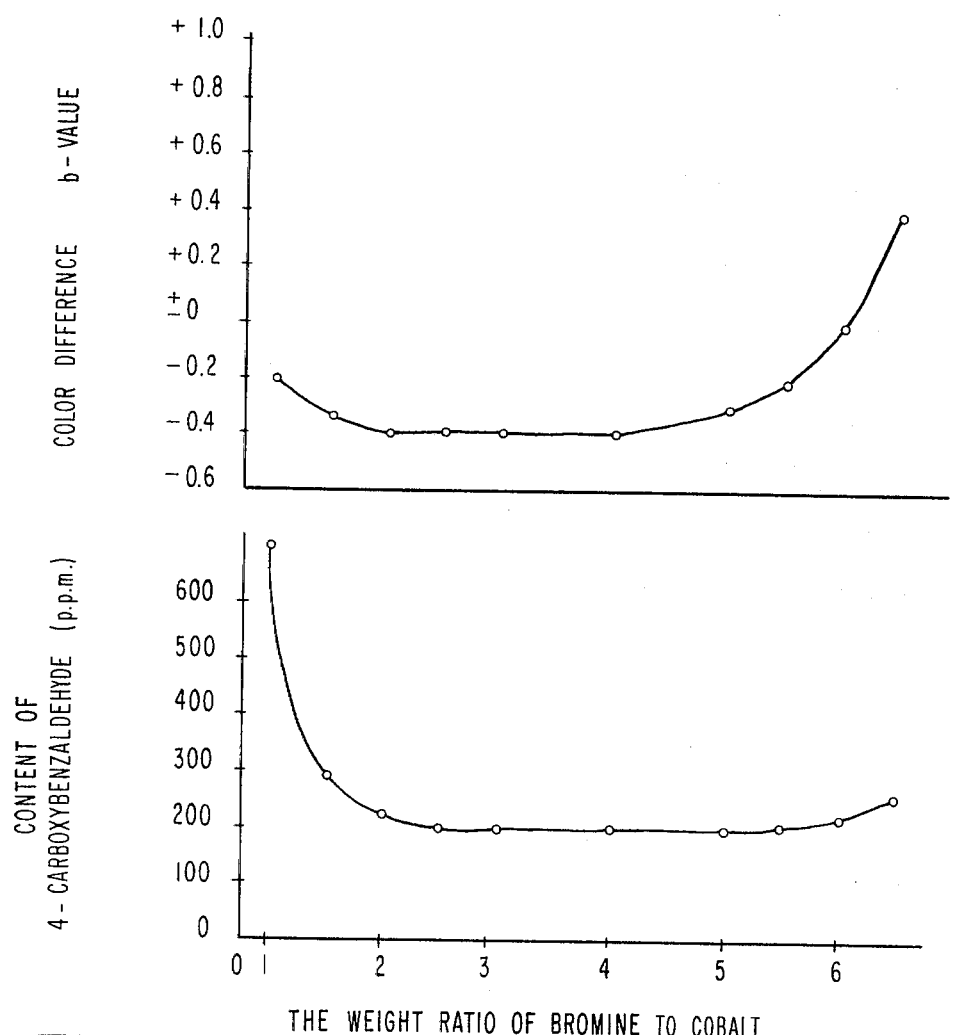

PROCESS FOR THE PRODUCTION OF FIBER GRADE TEREPHTHALIC ACID

BACKGROUND OF THE INVENTION

1. Field of the Invention

The present invention relates to a process for producing terephthalic acid. More particularly, the invention relates to a process for directly producing terephthalic acid by an oxidation reaction without any purification step. High-quality terephthalic acid capable of being used as the raw material for polyester formation by the direct polymerization thereof with a glycol is provided in accordance with the present invention. The term "fiber grade terephthalic acid" as used in the present specification refers to terephthalic acid of high quality suitable as a raw material for direct polymerization with glycols.

2. Description of the Prior Art

Various processes for producing terephthalic acid by subjecting an alkylated aromatic hydrocarbon such as p-xylene, etc., to a liquid-phase oxidation with molecular oxygen have been proposed hitherto. Among these processes, a process employing a heavy metal component such as cobalt, manganese, etc., together with bromine as the catalyst was developed by Scientific Design Co. (hereafter referred to as "SD process"). This process has been widely practiced.

The SD process is described, in detail, in the specification of Japanese Patent Publication No. 2666/'59 (corresponding to the original specification of a continuation-in-part application, U.S. Pat. No. 2,833,816). The terephthalic acid produced by the process of the said Japanese patent, however, contains a large amount of intermediate reaction products such as 4-carboxybenzaldehyde, etc., and a significant proportion of by-products. According to the examples of said Japanese patent only yellowish terephthalic acid having a purity of about 95 – 97 percent is obtained. Such a crude terephthalic acid cannot be used for direct polymerization to form polyesters. In order to produce polyesters from such poor quality crude terephthalic acid, it is necessary to convert the terephthalic acid to dimethyl terephthalate by esterification, and after purifying the dimethyl terephthalate, the polyester can be produced by an ester exchange reaction with ethylene glycol.

Alternatively complicated purification steps such as recrystallization, purification by hydrogenation, etc., can be used to purify the crude terephthalic acid to the purity necessary for direct polymerization with ethylene glycol. Under these circumstances, the SD process suffers from serious industrial and economic disadvantages.

Accordingly, if it could be possible to directly obtain terephthalic acid having a high quality which is capable of being directly used for polymerization with ethylene glycol by a one step oxidation reaction without complicated purification steps, the industrial and economic value thereof would be great. Though many studies and experiments have been made for obtaining terephthalic acid of good quality by liquid phase oxidations, no industrial process capable of directly producing terephthalic acid having high quality capable of being used for the direct polymerization has been reported prior to the present invention

SUMMARY OF THE INVENTION

From the results of detailed investigations into processes for producing terephthalic acid by subjecting p-xylene to a liquid phase oxidation with molecular oxygen in a lower aliphatic carboxylic acid as a solvent in the presence of a catalyst comprising cobalt, manganese, and bromine, the inventors have found that the quality of the terephthalic acid produced depends greatly upon the proportion of each component of the cobalt-manganese-bromine catalyst and upon the kind of bromine compounds used as the bromine source. We have also discovered the astonishing fact that terephthalic acid having good color and high purity, i.e., containing about 200 ppm of 4-carboxybenzaldehyde can be directly obtained at high yields over 96 percent, by oxidizing p-xylene under the specific conditions that the weight ratio of cobalt/solvent, manganese/cobalt, and bromine/cobalt in the catalyst are limited to specific ranges and that a particular material is employed as the source of bromine. Consequently, said terephthalic acid obtained by our new process is suitable for direct polymerization with glycols (for example, described in the specification of U.S. Pat. No. 3,050,533), and any additional purification step of the terephthalic acid is unnecessary.

An object of this invention is, therefore, to provide a process for directly producing highly-pure terephthalic acid capable of being directly used for polymerization with a glycol, said terephthalic acid being produced by only a one step liquid-phase oxidation reaction.

Another object of this invention is to provide a process for producing terephthalic acid for such a direct polymerization at high yields.

Still another object of this invention is to provide a process for producing terephthalic acid directly suitable for polymerization with a glycol by subjecting p-xylene to a liquid phase oxidation in the presence of a cobalt-manganese-bromine catalyst in which the proportion of each catalyst component is limited to a definite range.

Still yet another object of this invention is to provide a process for producing terephthalic acid useful for direct polymerization by subjecting p-xylene to a liquid oxidation reaction using cobalt bromide and/or free bromine as the source of bromine in the heretofore described catalyst.

Yet a further object of this invention is to provide a process for producing terephthalic acid directly useful for polymerizations containing as impurities about 200 ppm of 4-carboxybenzaldehyde.

An additional object of this invention is to provide a process for directly producing by a one step oxidation reaction a highly-pure terephthalic acid which does not require any subsequent purification treatments to be directly used in a polymerization process.

A further object of this invention is to provide a process of producing terephthalic acid useful for direct polymerizations which may profitably be used by the industry.

Other objects and advantages of the present invention will become apparent from the following detailed description of the invention.

BRIEF DESCRIPTION OF THE DRAWINGS

FIG. 5 is a graph showing the change of the color of terephthalic acid when the proportion of bromine to cobalt in the catalyst is varied;

FIG. 6 is a graph showing the change of the purity of terephthalic acid when the proportion of bromine to cobalt in the catalyst is varied;

DETAILED DESCRIPTION OF THE INVENTION

Figures 1, 2:
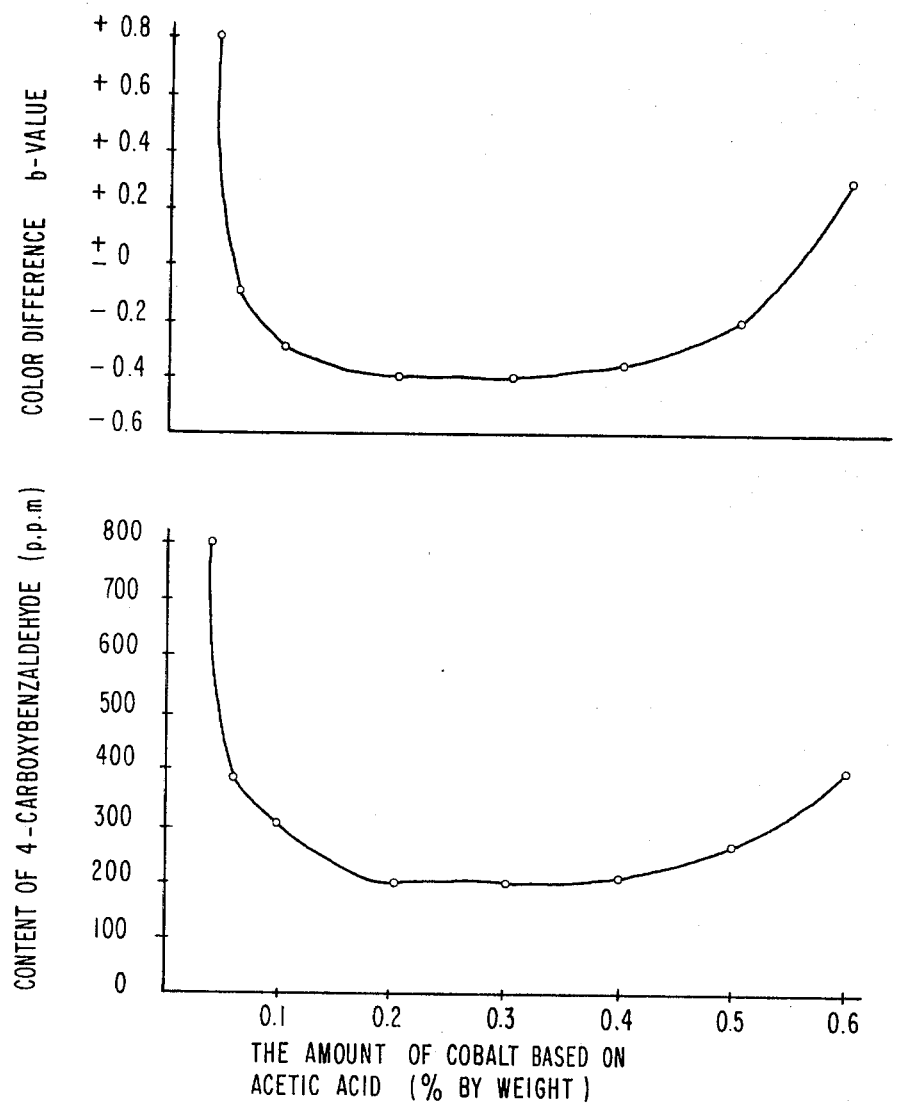
FIG. 1 is a graph showing the change of the color (color difference b-value by Color Machine) of terephthalic acid when the proportion of cobalt to solvent in the catalyst is varied in the liquid-phase oxidation of p-xylene.
FIG. 2 is a graph showing the change of the purity (content of 4-carboxybenzaldehyde in ppm.) of terephthalic acid when the proportion of cobalt to solvent is varied.

This invention comprises a process for producing terephthalic acid useful for direct polymerization by subjecting p-xylene to a liquid phase oxidation with oxygen or an oxygen-containing gas in a lower aliphatic carboxylic acid solvent in the presence of a specific cobalt-manganese-bromine catalyst which satisfies the following four criteria:

a. the amount of cobalt is in the range of 0.05 – 0.50 percent by weight based on the lower aliphatic carboxylic acid solvent, b. the amount of manganese is in the range of 1 – 20 percent by weight based on cobalt, c. cobalt bromide and/or free bromine is used as the source of bromine in the catalyst, and d. the weight ratio of bromine to cobalt is in the range of 1.5 : 1 – 6.0 : 1.

According to the process of this invention high-quality terephthalic acid useful for direct polymerization containing only about 200 ppm of 4-carboxybenzaldehyde can be obtained by a single step oxidation reaction.

The advantages of this invention and the excellent results obtained according to the process of this invention will become apparent from the accompanying drawings, the examples and the following descriptions.

The specification of Japanese Patent Publication No. 2666/'59 concerning the SD process discloses that the amount of the catalyst used therein is calculated as $MnBr_2$, the ratio of the heavy metal to bromine is provided only for the ratio of manganese to bromine, and in the examples manganese is the primary catalyst component used with cobalt being used in an amount at most as great as the manganese. Judging from these descriptions, it is apparent that the invention of said Japanese patent catalyst basically relates to catalytic effect of manganese as the heavy metal catalyst component, and that catalysts mainly composed of manganese are employed in the SD process. For example, in Examples 1 and 2, terephthalic acid is produced from p-diisopropylbenzene and p-xylene using a catalyst containing only manganese as the heavy metal component. Only colored terephthalic acid having a purity of about 95 – 97 percent is obtained and the yield of the product is as low as 40.5 percent and 75 percent in these examples. In Example 3, a mixture of cobaltous acetate and manganese acetate is used as the heavy metal component (the detailed ratio of cobalt to manganese is not clearly described), but only crude terephthalic acid of 97 percent purity is obtained at a low yield of 87 percent, Thus, the terephthalic acid obtained using a catalyst containing manganese as the main heavy metal component as in the above-mentioned Japanese patent contains reaction intermediate products such as 4-carboxybenzaldehyde, p-toluic acid, etc., and also by-products having an unknown structure. The purity thereof is about 95 – 97 percent and the product is colored yellow. Such a conventional process is not applicable to obtain pure terephthalic acid of more than 97 percent purity.

On the other hand, by our investigations of the catalytic effects of the components cobalt, manganese, and bromine on purity and color of terephthalic acid, we have firstly discovered that a cobalt-manganese-bromine catalyst primarily containing cobalt together with a small and definite amount of manganese gives an astonishingly improved catalytic effect, when the ratio of cobalt to the solvent and the ratio of bromine to cobalt are within definite ranges and a specific bromine compound is used as the source of bromine. We have also found that by using such a catalyst, the quality of terephthalic acid produced is greatly improved and high-quality terephthalic acid capable of being directly used for polymerizations can be obtained. As mentioned before, in the SD process, catalysts which contain mainly manganese as the heavy metal component have been employed as the most preferable catalyst.

It has hitherto been believed by the art that if the proportion of manganese to cobalt is reduced in an oxidation catalyst mainly consisting of cobalt and manganese, the activity of the catalyst is reduced, whereby the purity of terephthalic acid produced by the oxidation reaction is reduced. On the contrary, we surprisingly found that the catalytic activity of a cobalt-manganese-bromine catalyst containing cobalt as the main component and manganese as an adjuvant component is greatly increased. In addition, in the SD process, many bromine compounds have been employed as the source of bromine and these compounds have been considered to be equal in catalytic activity. Contrary to such a teaching, we have also found that the activity of the cobalt-manganese-bromine catalyst is affected by the source of bromine as well as the proportion of cobalt to manganese, and that cobalt bromide and free bromine give excellent catalytic activity as compared with other compounds.

Thus, the first feature of this invention is that the content of cobalt in the catalyst (calculated as cobalt) is limited to the definite range of 0.05 – 0.50 percent by weight, preferably 0.08 – 0.30 percent by weight based on the lower aliphatic carboxylic acid solvent. If the weight ratio of cobalt to the solvent is lower than the above-mentioned range, a satisfactory catalytic effect is not obtained, so that the impurity content in the product increases and high-quality terephthalic acid useful for direct polymerizations cannot be obtained.

On the other hand, if cobalt is used in an amount higher than the above-mentioned range, the increase in the amount of cobalt not only brings the process economic disadvantages but also causes a reduction in the quality product yield.

Experiments to provide the data upon which FIGS. 1 and 2 is based were carried out under the condition that free bromine was used as the source of bromine, the amount of manganese was 5 percent by weight based on cobalt the weight ratio of bromine to cobalt was 3 : 1 and the amount of cobalt based on the solvent varied. As is clear from FIGS. 1 and 2, the amount of cobalt based on the solvent must be in a range of 0.05 – 0.50 percent by weight, and if the amount of cobalt is outside the range, the quality of the terephthalic acid product is reduced.

Figures 3, 4:
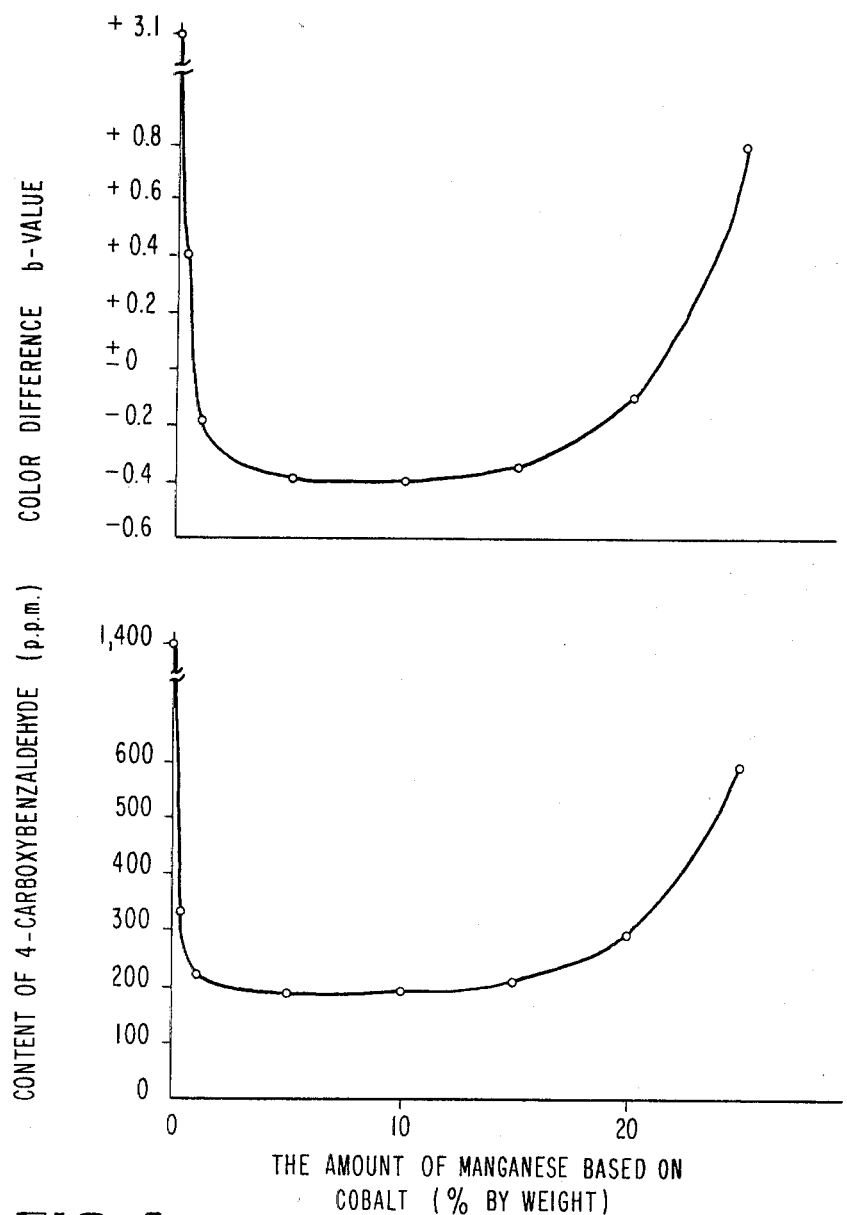
FIG. 3 is a graph showing the change of the color of terephthalic acid when the proportion of manganese to cobalt in the catalyst is varied.
FIG. 4 is a graph showing the change of the purity of terephthalic acid when the proportion of manganese to cobalt is varied.

The second feature of this invention is that the amount of manganese (calculated as manganese atoms) must be in the specific range of 1 – 20 percent by weight, preferably 1.5 – 13 percent by weight, based on cobalt. If the amount of manganese based on cobalt is outside the above-mentioned range, the desired catalytic effect is not obtained, whereby the quality of the terephthalic acid product is reduced and highly-pure terephthalic acid capable of being used for direct polymerization is not obtained. Experiments to provide the data upon which FIGS. 3 and 4 is based were carried out under the condition that cobalt bromide was used as the source of bromine in the catalyst, the weight ratio bromine to cobalt was 2.7 : 1, the amount of cobalt was 0.20 percent by weight based on the solvent, and the amount of manganese based on the cobalt varied. As is clear from FIGS. 3 and 4, amount of manganese based on the cobalt is outside the range of 1–20 percent by weight, terephthalic acid useful for direct polymerization having high purity and good color cannot be obtained Also, in the present invention, the desired catalytic effect is obtained by using bromine as a component of the catalyst in a definite range of concentration. That is, the third feature of this invention is that the amount of the bromine source is (calculated as bromine atoms) 1.5 – 6.0 times, preferably 2.5 – 4.0 times the weight of cobalt. If the weight ratio of bromine to cobalt is less than 1.5 : 1, the purity of the terephthalic acid produced is suddenly reduced, while if the ratio is over 6.0 : 1, the color of the terephthalic acid is greatly reduced. Thus, if the weight ratio is outside the aforesaid range, terephthalic acid useful for direct polymerization having excellent purity and color cannot be obtained.

Experiments to provide the data upon which FIGS. 5 and 6 is based were carried out under the condition that free bromine was used as the source of bromine in the catalyst, the amount of manganese based on the cobalt was 5.0 percent by weight, the amount of cobalt based on the solvent was 0.20 percent by weight and the weight ratio of bromine to cobalt varied. As is clear from FIGS. 5 and 6, if the weight ratio of bromine to cobalt is outside the range of 1.5 : 1 – 6.0 : 1, terephthalic acid having a high purity and good color cannot be obtained.

Moreover, it is necessary in the present invention to use a specific material as the bromine source of the catalyst.

In the production of terephthalic acid by the liquid phase oxidation of $p$-xylene in the presence of a cobalt-manganese-bromine catalyst, various bromine compounds have generally been used as the source of bromine in the catalyst. For example, in the specification of Japanese Patent Publication No. 2666/'59, many sources of bromine are disclosed, for example, free bromine, inorganic bromine compounds such as ammonium bromide, sodium bromide, potassium bromide, cobalt bromide and the like, and organic bromine compounds such as tetrabromoethane, benzyl bromide and the like. Thus, it is commonly known that cobalt bromide and free bromine can be used as the source of bromine in catalyst used for liquid phase oxidations. However, in the specification of the Japanese patent, these two compounds are simply recited together with many other compounds as the source of bromine of the same grade and there are no descriptions that the catalytic effect of the catalyst is influenced by the bromine source employed.

We have found that the employment of cobalt bromide and/or free bromine among the many bromine compounds is necessary, in combination with the specific conditions of defining the proportions of the compounds of the cobalt-manganese-bromine catalyst in the production of terephthalic acid by liquid phase oxidation is necessary to obtain excellent catalytic effects as compared to the case of using other bromine compounds, and that such a process can provide high-quality terephthalic acid useful for direct polymerizations. For example, if ammonium bromide (frequently used in the invention of Japanese Patent Publication No. 2666/'59 as the source of bromine) is employed under the other conditions of the present invention, excellent terephthalic acid useful for direct polymerizations cannot be obtained.

Figure 7:
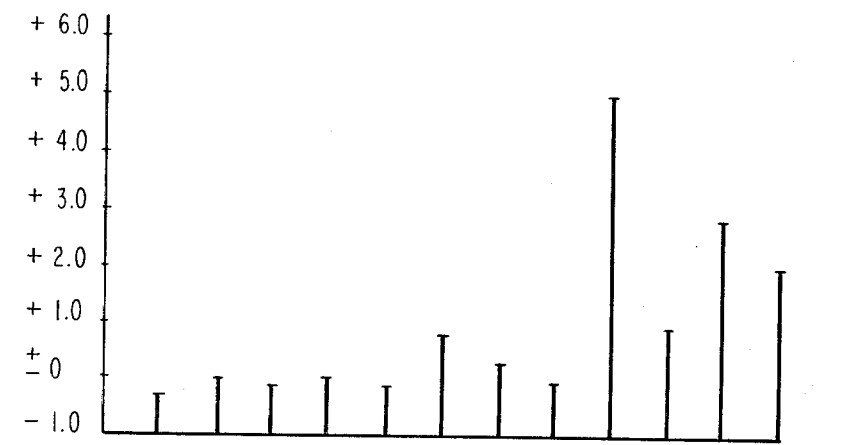
FIG. 7 is a graph showing the change of the color of terephthalic acid when the bromine source in the catalyst is varied.
Figure 8:
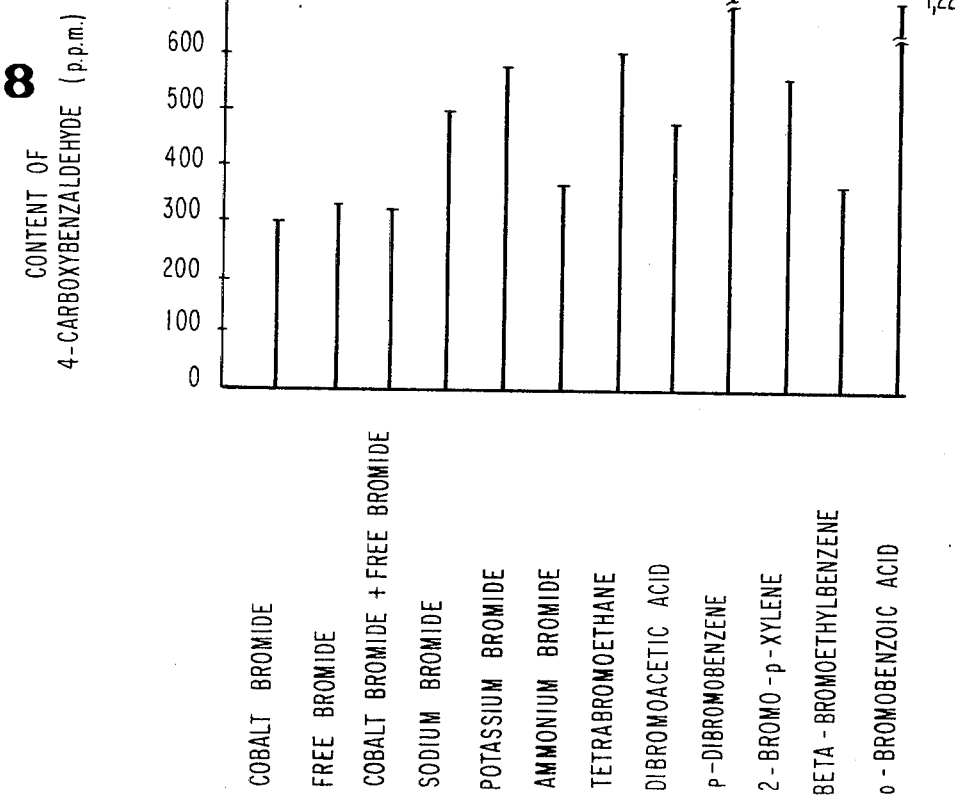
FIG. 8 is a graph showing the change of the purity of terephthalic acid when the bromine source in the catalyst is varied.

Thus, the fourth feature of this invention is to use cobalt bromide and/or free bromine as the source of bromine in the catalyst. In other words, by using cobalt bromide, free bromine, or a mixture thereof as the source of bromine in the catalyst, excellent catalytic activity can be obtained and high-quality terephthalic acid useful for direct polymerizations can be produced. Experiments to provide the data upon which FIGS. 7 and 8 is based were carried out under the condition that the weight ratio of bromine to cobalt was 2.7 : 1, the amount of manganese based on cobalt was 5.0 percent by weight, the amount of cobalt based on the solvent was 0.10 percent by weight and various sources of bromine were employed. As is clear from FIGS. 7 and 8, if a bromine compound other than cobalt bromide and/or free bromine is employed as the source of bromine, terephthalic acid having good purity and good color cannot be obtained.

As mentioned above, by conducting the liquid phase oxidation of $p$-xylene under the condition that the weight ratio of cobalt to the solvent, manganese to cobalt, and bromine to cobalt in the cobalt-manganese-bromine catalyst are defined to be within specific ranges, and also a specific material is employed as the source of bromine in the catalyst according to the present invention, the catalytic effect is remarkably increased to an extent as has never been possible by conventional oxidation processes of producing terephthalic acid. Consequently, the oxidation reaction is accelerated and high-quality terephthalic acid suitable for direct polymerization containing about 200 ppm of 4-carboxybenzaldehyde can be obtained. Thus, it will be understood that the process of this invention is quite excellent for industrial purposes as compared with any conventional processes for producing terephthalic acid by the liquid-phase oxidation of p-xylene.

In the prior art, liquid oxidation reactions for producing terephthalic acid, various attempts have hitherto been proposed in order to improve the oxidation reaction by defining the ratio of the heavy metal component and the bromine atoms in the catalyst to be within desirable ranges.

For example, in British Patent No. 951,192, the concentration of cobalt in the solvent and the atomic ratio of cobalt to bromine are defined, but manganese is not used as the heavy metal component.

In Japanese Patent Publication No. 329/'70, the ratio of cobalt to bromine and the ratio of cobalt to the raw material, p-xylene, are defined but manganese is not used as a heavy metal component. Also in this patent, the source of bromine to be employed in the catalyst is not limited and there is a disclosure that general bromine compounds can be used. The catalysts of these two patents are thus different from that of the present invention as described above.

It is further described in Japanese Patent Publication No. 5972/'55 that a catalyst in which the ratio of manganese/cobalt is from 1:10 to 100:1 can be employed to obtain terephthalic acid by the liquid phase oxidation of p-diisopropylbenzene, but in this process no bromine is used as a component of the catalyst. Thus, the catalyst of this patent is quite different from the catalyst of the present invention in composition. Furthermore, the purity of the terephthalic acid produced by said Japanese Patent is inferior and the yield of the product is at most about 40 percent.

As the source of cobalt in the catalyst of the present invention, various cobalt compounds which are soluble in the solvent and form cobalt salt of carboxylic acid solvent (e.g., acetic acid) in the reaction mixture can be used. These compounds may be in the divalent or trivalent state. Preferable examples of cobalt compounds are cobalt bromide which simultaneously provides bromine, and cobaltous acetate. Other cobalt salts of lower aliphatic carboxylic acids having 1–8 carbon atoms such as cobaltous propionate and cobaltous butyrate can also be used. In addition, cobalt salts of aromatic carboxylic acids such as cobaltous toluate and cobaltous terephthalate, cobaltous naphthenate, metallic cobalt powder, and organic complexes such as the acetylacetonate, the 8-hydroxy quinolinate and the ethylene diamine tetraacetate of cobalt can be used. Cobalt salts containing sulfate, nitrate, iodide, iodate, chloride or chlorate ions which inactivate the catalyst should be avoided.

As the source of manganese in the catalyst of the invention, various cobalt compounds which are soluble in the solvent and form cobalt salt of carboxylic acid solvent (e.g., acetic acid) in the reaction mixture can be used. Preferable examples are manganese salts of lower aliphatic carboxylic acids having 1 – 8 carbon atoms such as manganese acetate, manganese propionate and manganese butyrate. Manganese salts of aromatic carboxylic acids such as manganese toluate and manganese terephthalate, and manganese naphthenate can also be used. In addition, metallic manganese powder and organic complexes such as the acetylacetonate, the 8-hydroxy quinolinate and the ethylene diamine tetraacetate of manganese can be used. Manganese salts containing sulfate, nitrate, iodide, iodate, chloride or chlorate ions which inactivate the catalyst should be avoided.

Cobalt bromide used as the source of bromine in the present invention is usually the hexahydrate but the anhydride may also be used. Also, free bromine used in this invention may be in the gaseous or liquid state or may be used as an aqueous solution thereof.

As the solvent for the liquid phase oxidation reaction of this invention, a lower aliphatic carboxylic acid having 1 – 8 carbon atoms such as acetic acid, propionic acid and butyric acid can be employed. Acetic acid is preferably used. The weight ratio of the solvent to the raw material p-xylene is usually more than 2:1, and preferably 3:1 – 6:1.

As the oxidizing agent used in the oxidation reaction of this invention, molecular oxygen and an oxygen-containing gas are used. The oxygen concentration in an oxygen containing gas may be more than 7 percent by volume. The use of air is economically profitable. The ratio of total oxygen to p-xylene is in the range of 3 to 500 mols of oxygen per mol of p-xylene, desirably in the range of 5 to 300.

The oxidation reaction of this invention may be conducted at a temperature in the range of 80° – 230°C., and preferably 130° – 200°C..

Because the reaction is conducted in a liquid phase, it is necessary to conduct the reaction under pressures sufficient to maintain the p-xylene and the solvent in the liquid state at the reaction temperature. The preferred pressure range of the operation is in the range of 2 to 30 Kg/cm$^2$ gauge. The reaction time in the semi-continuous operation and the average holding time of the reactant in the continuous operation may be in the range of 0.5 to 6 hours, preferably 1 to 2 hours.

The oxidation reaction of the present invention is carried out according to conventional procedures. P-xylene, the solvent and the catalyst are charged into a closed reaction vessel, and the reaction mixture is brought to reaction temperature and pressure and stirred rapidly. At this time, oxygen is passed into the reaction mixture. After the reaction is over, the products are removed from the reaction vessel and terephthalic acid is isolated by conventional means such as centrifuging and filtration. The thus obtained terephthalic acid is washed with acetic acid or water.

The process of the present invention is desirably carried out as a continuous operation or as a semi-continuous operation rather than a batch operation.

According to the process of this invention as described above in detail, highly-pure terephthalic acid useful for direct polymerizations, e.g., with a glycol to form a polyester can be quite readily produced only by an oxidation reaction step without complicated purification steps, and such excellent terephthalic acid can be produced in a high yield as well. Thus, the present invention has great industrial and economical advantages.

The highly-pure terephthalic acid produced by the process of the present invention can provide high-quality polyesters valuable as raw materials for synthetic fibers and resins by direct polymerization or copolymerication with a glycol.

The following examples are intended to illustrate the present invention but not to limit it in any way.

EXAMPLE 1

Into a 40 liter pressure reaction vessel of titanium equipped with a reflux condenser, a stirrer, a heating means, an inlet for raw materials, a gas inlet, and an outlet for reaction products were charged 12 kg of acetic acid, 40.7 g. of cobaltous acetate tetrahydrate, 2.2 g. of manganese acetate tetrahydrate, and 28.8 g. of free bromine (i.e., the amount of cobalt based on acetic acid was 0.08 percent by weight, the amount of manganese based on cobalt was 5 percent by weight, and the weight ratio of bromine to cobalt was 3.0 : 1.0) and 1 kg/hr of p-xylene and air at the rate of 4.2 liters per gram of p-xylene were fed into the system for 2 hours to conduct the oxidation reaction at a temperature of 190°C. and at a pressure of 20 kg/cm². After the reaction was completed, the reaction product was withdrawn. The solid product was separated from the liquid phase, washed with acetic acid and dried. The properties and the yield of the terephthalic acid obtained are shown in Table 1.

EXAMPLE 2

The same procedure as in Example 1 was followed except that 101.6 g. of cobaltous acetate tetrahydrate, 5.4 g. of manganese acetate tetrahydrate, and 72.0 g. of free bromine were used as the catalyst (the amount of cobalt based on acetic acid was 0.2 percent by weight, the amount of manganese based on cobalt and the weight ratio of bromine to cobalt were the same as in Example 1). The properties and the yield of the terephthalic acid thus obtained are shown in Table 1.

EXAMPLE 3

The same procedure as in Example 1 was followed except that 254.0 g. of cobaltous acetate tetrahydrate, 13.5 g. of manganese acetate tetrahydrate, and 180 g. of free bromine were used as the catalyst (the amount of cobalt based on acetic acid was selected to be 0.5 percent by weight, the weight ratio of manganese to cobalt and bromine to cobalt were the same as in Example 1.) The properties and the yield of terephthalic acid thus obtained are shown in Table 1.

COMPARATIVE EXAMPLE 1

The same procedure as in Example 1 was followed except that 20.4 g. of cobaltous acetate tetrahydrate, 1.1 g. of manganese acetate tetrahydrate, and 14.4 g. of free bromine were used (the amount of cobalt based on acetic acid was selected to be 0.04 percent by weight, the weight ratio of manganese to cobalt and bromine to cobalt were the same as in Example 1). The properties and the yield of the terephthalic acid thus obtained are shown in Table 1.

COMPARATIVE EXAMPLE 2

The same procedure as in Example 1 was followed except that 304.8 g. of cobaltous acetate tetrahydrate, 16.2 g. of manganese acetate tetrahydrate, and 216 g. of free bromine were used as the catalyst (the amount of cobalt based on acetic acid was 0.6 percent by weight, the weight ratio of manganese to cobalt and bromine to cobalt were the same as in Example 1.) The properties and the yield of the terephthalic acid are shown in Table 1.

Table 1

|  | (A) | (B) | (C) | (D) | (E) | (F) |
| --- | --- | --- | --- | --- | --- | --- |
| Example 1 | 0.08 | 99.96 | 310 | <0.01 | −0.3 | 96 |
| Example 2 | 0.20 | 99.97 | 200 | <0.01 | −0.4 | 97 |
| Example 3 | 0.50 | 99.97 | 270 | <0.01 | −0.4 | 97 |
| Comparative Example 1 | 0.04 | 99.91 | 800 | 0.02 | +0.8 | 93 |
| Comparative Example 2 | 0.60 | 99.95 | 400 | 0.02 | +0.3 | 94 |

Note:
(A) Amount of cobalt based on acetic acid in % by weight,
(B) Purity of terephthalic acid in % by weight,
(C) Content of 4-carboxybenzaldehyde in ppm.,
(D) Molar extinction coefficient (at 380 mµ)*,
(E) Color difference b-value**, and
(F) Theoretical yield of terephthalic acid in %.

* After dissolving 5 g. of terephthalic acid in 100 ml. of 2 N aqueous ammonia, the absorption of the solution at 380 mµ was measured by means of a spectrophotometer. The smaller the value, the better the color.
** So-called external color which shows the reflected light from solid terephthalic acid measured by means of a color-difference meter (CM-20) made by the Color Machine Co., the b-value shows yellow (+)-blue (−), and the smaller the value, the better the color within the range of the examples of this invention.

EXAMPLES 4 – 6

The same procedures as in Example 1 were followed except that 134 g. of cobalt bromide hexahydrate was used, the amount of cobalt to acetic acid was selected so as to be 0.20 percent by weight, the weight ratio of bromine to cobalt was selected to be 2.7 : 1, and manganese acetate tetrahydrate was used so that the amount of manganese based on cobalt was 1.0 percent by weight, 7.0 percent by weight, and 15 percent by weight, respectively. The properties and the yield of each terephthalic acid for each case are shown in Table 2.

COMPARATIVE EXAMPLES 3 & 4

The same procedures as in Example 1 were followed except that 134 g. of cobalt bromide hexahydrate was used, the amount of cobalt atoms based on acetic acid was selected to be 0.20 percent by weight, the weight ratio of bromine to cobalt was selected to be 2.7 : 1, and no manganese compound was used (in Comparative Example 3), or manganese acetate tetrahydrate was used so that the amount of manganese based on cobalt was 25.0 percent by weight (in Comparative Example 4). The properties and the yield of terephthalic acid are shown in Table 2 for each Comparative Example.

Table 2

|  | (A') | (B) | (C) | (D) | (E) | (F) |
| --- | --- | --- | --- | --- | --- | --- |
| Example 4 | 1 | 99.97 | 230 | <0.01 | −0.2 | 96 |
| Example 5 | 7 | 99.97 | 200 | <0.01 | −0.4 | 97 |
| Example 6 | 15 | 99.97 | 220 | <0.01 | −0.35 | 96 |
| Comparative Example 3 | 0 | 99.8 | 1400 | 0.035 | +3.1 | 91 |
| Comparative Example 4 | 25 | 99.93 | 600 | 0.02 | +0.8 | 93 |

Note:
(A') Amount of manganese based on cobalt in % by weight. (B), (C), (D), (E), and (F) are the same as those in Table 1.

EXAMPLES 7 – 9

The same procedure as Example 1 was followed except that 101.6 g. of cobaltous acetate tetrahydrate and 5.4 g. of manganese acetate tetrahydrate were used, the amount of cobalt based on acetic acid being selected to be 0.20 percent by weight, the amount of manganese to cobalt was 5.0 percent by weight, and free bromine was used so that the weight ratio of bromine based on cobalt atoms 2.0 : 1, 4.0 : 1 and 5.0 : 1 respectively. The properties and the yield of terephthalic acid thus obtained for each run are shown in Table 3.

COMPARATIVE EXAMPLES 5 & 6

The same procedure as Example 1 was followed except that 101.6 g. of cobaltous acetate tetrahydrate and 5.4 g. of manganese acetate tetrahydrate were used, the amount of cobalt based on acetic acid was 0.20 percent by weight, the amount of manganese based on cobalt 5.0 percent by weight, and free bromine was used so that the weight ratio of bromine atoms to cobalt atoms was 1 : 1 and 6.5 : 1, respectively. The properties and the yields of terephthalic acid thus obtained as shown in Table 3.

Table 3

|  | (A″) | (B) | (C) | (D) | (E) | (F) |
|---|---|---|---|---|---|---|
| Example 7 | 2.0 | 99.96 | 230 | <0.01 | −0.4 | 96 |
| Example 8 | 4.0 | 99.97 | 200 | <0.01 | −0.4 | 97 |
| Example 9 | 5.0 | 99.97 | 200 | <0.01 | −0.3 | 96 |
| Comparison Example 5 | 1.0 | 99.92 | 700 | <0.01 | −0.2 | 93 |
| Comparison Example 6 | 6.5 | 99.96 | 260 | 0.02 | +0.4 | 95 |

Note:
(A″) Proportion of bromine to cobalt in weight times; (B), (C), (D), (E), and (F) are the same as those in Table 1.

EXAMPLE 11

The same procedure as in Example 1 was followed except that 50.8 g. of cobaltous acetate tetrahydrate, 2.7 g. of manganese acetate tetrahydrate, and 32.4 g. of free bromine were used and the amount of cobalt based on acetic acid was 0.10 percent by weight, the amount of manganese based on cobalt was 5.0 percent by weight, and the weight ratio of bromine to cobalt was 2.7 : 1, as in Example 10. The properties and the yield of terephthalic acid are shown in Table 4.

EXAMPLE 12

The same procedure as in Example 1 was followed except that 33.3 g. of cobalt bromide hexahydrate, 25.4 g. of cobaltous acetate tetrahydrate, and 2.7 g. of manganese acetate tetrahydrate were used, and the amount of cobalt based on acetic acid was 0.10 percent by weight, the amount of manganese based on cobalt was 5.0 percent by weight, and the weight ratio of bromine to cobalt was 2.7 : 1, as in Example 10. The properties and the yield of the terephthalic acid thus obtained as shown in Table 4.

Comparative Examples 7 – 15

The same procedure as Example 1 was followed except that 50.8 g. of cobaltous acetate tetrahydrate and 2.7 g. of manganese acetate tetrahydrate were used and the amount of cobalt based on acetic acid was 0.01 percent by weight, and the amount of manganese based on cobalt was 5.0 percent by weight as in Examples 10 – 12. However, various bromine compounds other than cobalt bromide or free bromine (as shown in Table 4) were used in such an amount that the weight ratio of bromine to cobalt was 2.7 : 1 in each case. The properties and the yield of terephthalic acid for each run are shown in Table 4.

Table 4

| Example | Bromine Source | (B) | (C) | (D) | (E) | (F) |
|---|---|---|---|---|---|---|
| 10 | Cobalt bromide | 99.97 | 300 | <0.01 | −0.07 | 97 |
| 11 | Free bromine | 99.96 | 330 | do. | ±0 | 96 |
| 12 | Cobalt bromide + free bromine | do. | 320 | do. | −0.09 | do. |
| Comp. Ex. | | | | | | |
| 7 | Sodium bromide | 99.94 | 500 | 0.010 | ±0 | do. |
| 8 | Potassium bromide | do. | 580 | do. | −0.1 | do. |
| 9 | Ammonium bromide | 99.96 | 370 | 0.020 | +0.8 | do. |
| 10 | Tetrabromoethane | 99.93 | 610 | 0.014 | +0.3 | 95 |
| 11 | Dibromoacetic acid | 99.95 | 480 | 0.011 | ±0 | do. |
| 12 | p-Dibromobenzene | 97.7 | 31000 | 0.050 | +5.1 | 88 |
| 13 | 2-Bromo-p-xylene | 99.94 | 560 | 0.021 | +1.0 | 95 |
| 14 | β-bromoethyl benzene | 99.96 | 370 | 0.032 | +2.9 | 96 |
| 15 | o-Bromobenzoic acid | 99.8 | 1220 | 0.029 | +2.1 | 93 |

EXAMPLE 10

The same procedure as in Example 1 was followed except that 66.7 g. of cobalt bromide hexahydrate and 2.7 g. of manganese acetate tetrahydrate were used, the amount of cobalt atoms based on acetic acid being 0.10 percent by weight, the weight ratio of manganese based on cobalt being 5.0 percent by weight, and the weight ratio of bromine to cobalt being 2.7 : 1. The properties and the yield of terephthalic acid are shown in Table 4.

EXAMPLE 13

12 Kg of acetic acid, 134 g. of cobalt bromide hexahydrate and 1.1 g. of manganese acetate tetrahydrate were charged into the same reaction vessel used in Example 1 so that the amount of cobalt based on acetic acid was 0.20 percent by weight, the weight ratio of bromine to cobalt was 2.7 : 1 and the amount of manganese based on cobalt was 1.0 percent by weight, and p-xylene was passed thereinto at a rate of 1 Kg/hr and air was passed at a rate of 4.2l per 1 g. of p-xylene for 30 minutes while maintaing the system at a temperature of 190°C. and a pressure of 20 Kg/cm². Subsequently, while continously passing air and p-xylene thereinto, a catalyst-acetic acid solution (the amount of cobalt bromide and manganese acetate to acetic acid was the same as initially charged in the reaction vessel) was passed thereinto at a rate of 6 Kg/hr., and the reaction was performed in a continuous manner while continuously withdrawing the reaction product from the discharge outlet so that the contents in the vessel remained constant. After 3 hours the reaction system reached steady state. The reaction product obtained at steady state was separated into a solid and liquid and washed with acetic acid and dried. The properties and yield of terephthalic acid obtained are shown in Table 5.

EXAMPLES 14 & 15

The continuous reaction was carried out in the same manner in Example 13 with the exception of using manganese acetate tetrahydrate so that the amount of manganese based on cobalt was 7.0 percent by weight, and 15.0 percent, by weight, respectively. The properties and yield of terephthalic acid obtained are shown in Table 5.

Table 5

| Example | (A') | (B) | (C) | (D) | (E) | (F) |
|---|---|---|---|---|---|---|
| 13 | 1 | 99.97 | 240 | <0.01 | −0.3 | 97 |
| 14 | 7 | 99.97 | 200 | <0.01 | −0.4 | 97 |
| 15 | 15 | 99.97 | 230 | <0.01 | −0.4 | 96 |

What is claimed is:

1. A process for producing terephthalic acid useful for direct polymerizations comprising subjecting p-xylene to a liquid-phase oxidation with oxygen or an oxygen-containing gas in a lower aliphatic carboxylic acid solvent in the presence of a cobalt-manganese-bromine catalyst, said catalyst meeting the following conditions:
   a. the amount of cobalt is in a range of 0.05 to 0.50 percent by weight based on the weight of lower aliphatic carboxylic acid solvent,
   b. the amount of manganese is in a range of 1 to 20 percent by weight based on the weight of cobalt,
   c. cobalt bromide, free bromine, or a mixture thereof is the source of bromine, and
   d. the weight ratio of bromine to cobalt is in the range of 1.5 : 1 to 6.0 : 1.

2. The process as claimed in claim 1, wherein cobalt bromide is used as the source of bromine.

3. The process as claimed in claim 1, wherein free bromine is used as the source of bromine.

4. The process as claimed in claim 1, wherein a mixture of cobalt bromide and free bromine is used as the source of bromine.

5. The process as claimed in claim 1, wherein the weight ratio of bromine to cobalt is 2.5 : 1 to 4.0 : 1.

6. The process as claimed in claim 1, wherein the amount of manganese based on cobalt is 1.5 to 13 percent by weight.

7. The process as claimed in claim 1, wherein the amount of cobalt based on the solvent is 0.08–0.30 percent by weight.

8. The process as claimed in claim 1, wherein the weight ratio of bromine to cobalt is 2.5 : 1 to 4.0 : 1, the amount of manganese based on cobalt is 1.5 – 13 percent by weight, and the amount of cobalt based on solvent is 0.08 – 0.30 percent by weight.

9. The process as claimed in claim 1, wherein an aliphatic carboxylic acid having 1 to 8 carbon atoms is used as the solvent.

10. The process as claimed in claim 1, wherein acetic acid is used as the solvent.

11. The process as claimed in claim 1, wherein cobalt bromide, cobalt acetate, or cobalt naphthenate is used as the source of cobalt.

12. The process as claimed in claim 1, wherein manganese acetate or manganese naphthenate is used as the source of manganese.

13. The process as claimed in claim 1, wherein the oxidation reaction is conducted at a temperature of 80° to 230°C.

14. The process as claimed in claim 1, wherein the oxidation reaction is conducted under the pressure sufficient to maintain the p-xylene and the solvent in the liquid phase at the reaction temperature.

15. The process as claimed in claim 1, wherein the weight of the solvent is greater than 2 times the weight of p-xylene.

16. The process as claimed in claim 1, wherein the reaction temperature is 130° to 200°C.

17. The process as claimed in claim 1, wherein the weight of the solvent is 3 to 6 times the weight of the p-xylene.

18. The process as claimed in claim 1, wherein the oxygen concentration in an oxygen containing gas is more than 7 percent by volume.

19. The process as claimed in claim 1, wherein the oxidation reaction is conducted at a pressure of 2 to 30 kg/cm² gauge.

20. The process as claimed in claim 1, wherein air is used as the oxygen-containing gas.

21. The process as claimed in claim 1, wherein the average holding time of the reaction is within the range of 0.5 to 6 hours.

22. The process as claimed in claim 21 wherein said average holding time is in the range of 1 to 2 hours.

* * * * *